United States Patent [19]

May

[11] Patent Number: 5,524,080
[45] Date of Patent: Jun. 4, 1996

[54] TRACTION CONTROL WITH VARIABLE THRESHOLD

[75] Inventor: Kenneth A. May, Churchville, N.Y.

[73] Assignee: Zexel Torsen Inc., Rochester, N.Y.

[21] Appl. No.: 343,124

[22] Filed: Nov. 22, 1994

[51] Int. Cl.⁶ .................................................. B60K 28/16
[52] U.S. Cl. ........................... 364/426.03; 180/197
[58] Field of Search ................ 364/426.01, 426.03; 180/197; 303/139, 154, 199, DIG. 6

[56] References Cited

U.S. PATENT DOCUMENTS

| | | | |
|---|---|---|---|
| 4,762,196 | 8/1988 | Harada et al. | 180/197 |
| 5,117,934 | 6/1992 | Tsuyama et al. | 180/197 |
| 5,122,101 | 6/1992 | Tseng | 475/252 |
| 5,159,991 | 11/1992 | Tsuyama et al. | 180/197 |
| 5,213,177 | 5/1993 | May | 180/197 |
| 5,244,440 | 9/1993 | Ichiki et al. | 475/252 |
| 5,257,857 | 11/1993 | Okazaki | 303/103 |
| 5,269,390 | 12/1993 | Glover et al. | 180/197 |
| 5,293,315 | 3/1994 | Kolbe et al. | 364/424.02 |
| 5,315,519 | 5/1994 | Chin et al. | 364/426.02 |
| 5,320,422 | 6/1994 | Tsuyama et al. | 303/110 |
| 5,431,241 | 7/1995 | May et al. | 180/197 |

OTHER PUBLICATIONS

"Analysis of Traction Control Systems Augmented by Limited Slip Differentials" by R. K. Holzwarth and K. A. May, Reprinted from: ABS/TCS and Brake Technology Developments (SP-1018), SAE Technical Paper Series, 940831, pp. 53–61, 1994.

*Primary Examiner*—Michael Zanelli
*Attorney, Agent, or Firm*—Eugene Stephens & Associates

[57] ABSTRACT

A power limiting system, such as an engine output power regulator (32), is combined with a power distributing system, such as a torque proportioning differential (18), to limit excessive wheel slip while utilizing more of available traction. Slip determination and control logic (36) reduces drive power with respect to operator demand in response to a measure of wheel slip above a threshold "T". Threshold determining logic (56) adjusts the threshold "T" from a first target value "T1" to a higher second target value "T" from a the drive power is reduced and drive wheels (24 and 26) are rotating at the same speed.

11 Claims, 4 Drawing Sheets

1

TRACTION CONTROL WITH VARIABLE THRESHOLD

TECHNICAL FIELD

The invention relates to the field of vehicle traction control in which drive power to a pair of drive wheels is regulated for limiting drive wheel slippage with respect to traction surfaces.

BACKGROUND

Traction control systems of motor vehicles limit wheel slipping in which one or more drive wheels overrun their traction surfaces. Slipping occurs when more torque is applied to a drive wheel than can be withstood by its traction surface for correspondingly moving the vehicle. The excess torque causes a sudden increase in drive wheel rotational speed with respect to its traction surface, referred to herein as wheel slipping.

Traction, which is measured as a force, is a function of wheel slip, which is measured as a percentage of overall drive wheel rotation in excess of rolling contact with the traction surface. A small percentage of wheel slip is needed to fully exploit the available traction force, but larger percentages of wheel slip reduce the traction force. Accordingly, wheel slipping, i.e., large percentages of wheel slip, actually reduces the amount of power that can be used to move a vehicle.

Traction control systems regulate drive power to the drive wheels by limiting the total drive power reaching the drive wheels or by influencing the distribution of drive power between the drive wheels. Power limiting systems regulate the delivery of power to a group of drive wheels, and power distributing systems divide the power in different proportions between the drive wheels.

For example, engine output power limiting systems regulate the delivery of drive power by controlling various engine functions including ignition, air intake, fuel intake, and exhaust. Engine controllers already regulate some or all of these functions, so little additional hardware is required to implement traction control. However, throttle controls are often preferred for directly overriding operator commands to the engine. Drive line power limiting systems interrupt the flow of power between the engine and the drive wheels by applying a braking force to the drive line or by temporarily disconnecting it.

Active or passive differentials can be used to influence the distribution of drive power between drive wheels. Active differentials have external controls that vary either frictional resistance to relative rotation between drive wheels (i.e., differentiation) or the speed ratio at which they are interconnected. Passive differentials develop frictional resistance to differentiation as a function of either the amount of differentiation or the amount of torque being transmitted.

Power distributing systems resist one drive wheel from slipping in advance of another by distributing more torque to the drive wheel having better traction but do not prevent both drive wheels from slipping together. Power limiting systems resist either or both drive wheels from slipping but do not exploit traction differences between the drive wheels.

Wheel braking systems have been used for both limiting the total drive power reaching the drive wheels and varying the distribution of the drive power between the drive wheels. However, the wheel brakes are not well suited for performing either function. The application of individual wheel brakes can produce shocks in the drive line or reflect excess torque between drive wheels resulting in drive line instabilities known as "hunting". Use of the wheel brakes for traction control accelerates their wear. Engine output power can often overwhelm the power-absorbing capacities of the wheel brakes. The application of the wheel brakes requires the generation of fluid pressure and its controlled conversion into mechanical braking torques, which can delay appropriate braking responses.

U.S. Pat. No. 5,269,390 to Glover et al. discloses a traction control system that combines an engine output power limiting system with a passive differential. Wheel slip is measured, and the engine output power limiting system reduces the drive power with respect to operator demand in response to a measure of wheel slip above a threshold. The passive differential is of the viscous coupling type that generates frictional torque opposing high rates of differentiation. The threshold is set to a much higher target value when only one drive wheel slips to allow the limited slip differential to operate properly.

However, viscous coupling type differentials only oppose high rates of wheel slip, and this limits the traction force available to the slipping drive wheel. The additional torque that can be delivered to the non-slipping wheel is also limited by activation of the engine output power limiting system at the higher target value of wheel slip. On the other hand, the higher target value delays any needed response of the engine output power limiting system to excessive wheel slip.

SUMMARY OF INVENTION

My invention in one or more of its various embodiments provides for limiting excessive wheel slip while better exploiting available traction to more closely match the delivery of drive power to drive wheels with operator demand. A quick response is provided when one or more drive wheels excessively slip. However, operator demand for drive power is more closely matched by dividing drive torque between drive wheels in accordance with traction conditions.

One example of my invention includes both a power limiting system that regulates drive power to a pair of drive wheels and a power distributing system that divides the drive power between the pair of drive wheels. Sensors detect relative rotation between drive wheels and wheel slip of either or both drive wheels. A first control logic reduces the drive power with respect to operator demand in response to a measure of wheel slip above a threshold and restores the drive power to the operator demand in response to the measure of wheel slip below the threshold. A second control logic adjusts the threshold from a first target value to a higher second target value when (a) the drive power does not match operator demand and (b) the drive wheels are rotating at the same speed.

Thus, the power limiting system is activated at the lower first target value of the threshold regardless of whether one or both drive wheels slip. However, if both drive wheels are rotating at the same rate; the threshold is increased to the higher second target value to permit the power distributing system to divide torque in different proportions between the drive wheels. The threshold is returned to the lower first target value after the drive power is restored to the operator demand.

The power distributing system is preferably a torque proportioning differential that divides drive torque between relatively rotating drive wheels in a bias ratio of at least 1.5 to 1. Once relative rotation takes place, torque is already divided at the bias ratio—so excessive wheel slip must be opposed by other means. On the other hand, a lack of relative rotation indicates the possibility of further dividing torque between drive wheels in accordance with traction conditions. The higher second target value for the threshold permits such a division of torque between the drive wheels.

Preferably, additional conditions must be met before the threshold is adjusted to the higher second target value. First, the rate of change of wheel slip is required to be less than a predetermined rate associated with incipient wheel slipping. Second, the measure of wheel slip is required to be below the second target value. In other words, the threshold is not raised if the rate of wheel slip is significantly increasing or exceeds the higher second target value.

DETAILED DESCRIPTION

Figure 1:
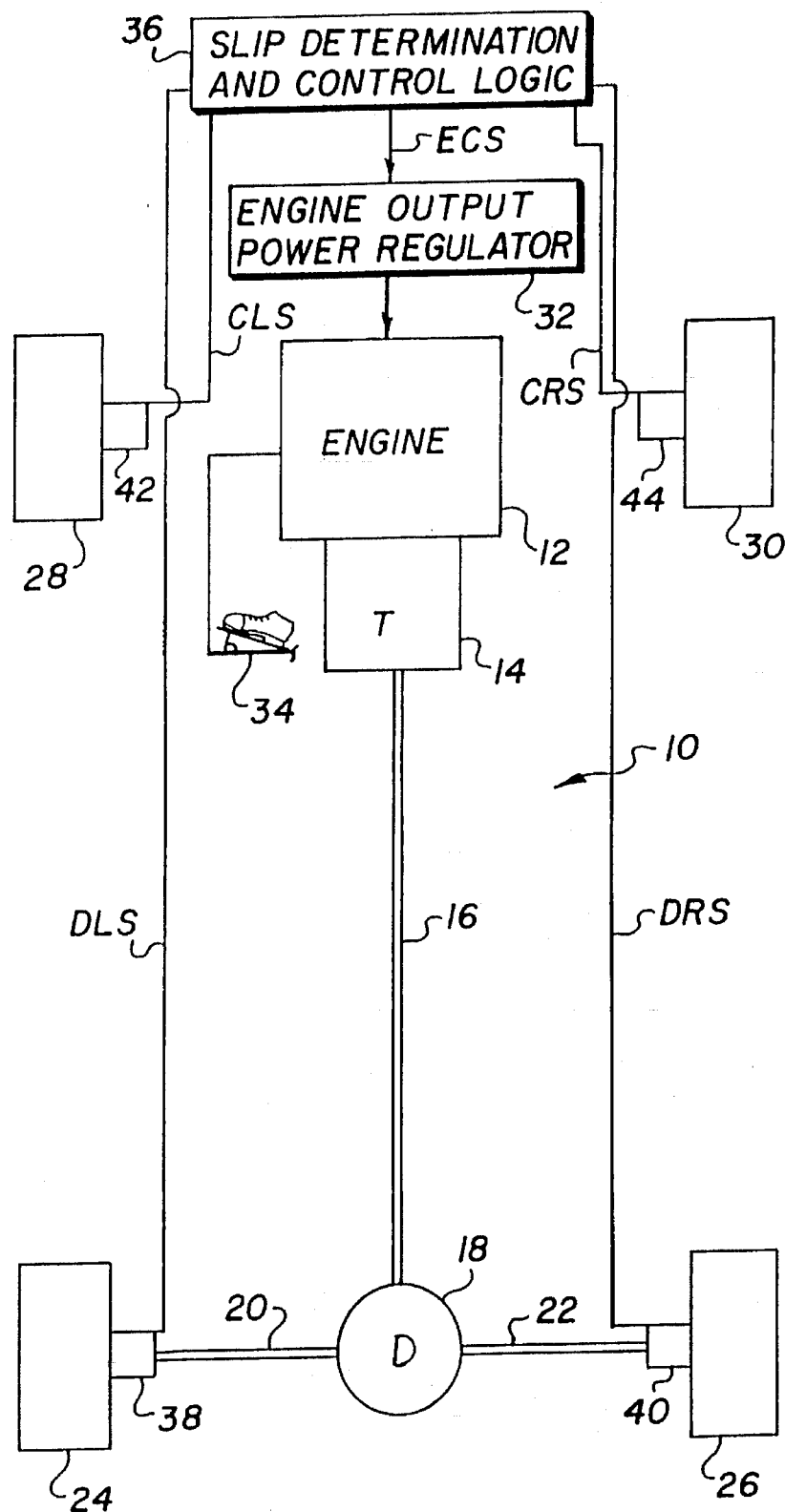
FIG. 1 is a block diagram of my new traction control system connected to a vehicle drive train.

My new traction control system is illustrated together with a vehicle drive train 10, which starts with an engine 12 that provides a source of drive power. A transmission 14 and a drive shaft 16 transmit the drive power to a differential 18 that divides the drive power between a pair of relatively rotatable axle halves 20 and 22. Left and right drive wheels 24 and 26 are coupled to the respective axle halves 20 and 22. Left and right non-driven or coast wheels 28 and 30 rotate independently of the drive train.

Although for ease of layout the drive train 10 is arranged for a rear wheel drive vehicle, the invention is equally applicable to front wheel drive vehicles. The invention can also be applied to all wheel drive vehicles or other multi-axial drive vehicles in which drive power is divided between drive wheels.

The differential 18, which provides a power distributing system, resists the onset of relative rotation (i.e., differentiation) between the axle halves 20 and 22. Preferably, the differential is a passive device, such as a torque proportioning differential that develops a frictional resistance to differentiation as a proportion of the torque transmitted between the drive shaft 16 and the axle halves 20 and 22. This torque proportioning characteristic is more commonly expressed as a "bias ratio", which is a ratio of the respective amounts of torque in the axle halves 20 and 22. The bias ratio of differential 18 is preferably at least 1.5 to 1.

While differentiating (i.e., the dynamic mode of operation), torque is divided between the axle halves 20 and 22 in accordance with the bias ratio. However, while not differentiating (i.e., the static mode of operation), torque can be divided in any lesser ratio up to the bias ratio. Once one of the drive wheels 24 and 26 has exhausted all of its available traction, additional torque is diverted to the other of the drive wheels 24 and 26 until the traction available to the other drive wheel is also exhausted and both drive wheels begin slipping or the bias ratio is reached and the lower traction drive wheel begins slipping.

While a variety of differentials, such as limited-slip or torque proportioning differentials, could be used to provide resistance to the onset of differentiation, parallel-axis gear differentials such as described in coassigned U.S. Pat. Nos. 5,122,101 and 5,244,440 are preferred. Both of these patents are hereby incorporated by reference.

An engine output power regulator 32, which provides a power limiting system, overrides an operator demand 34 for drive power and limits the amount of drive power that is delivered to the differential 18 for distribution to the drive wheels 24 and 26. The engine output power regulator 32 can be arranged to regulate the generation of drive power by controlling engine functions such as ignition, air intake, fuel intake, or exhaust or by interrupting the flow of drive power to the differential 18 such as by braking the engine 12.

A coassigned U.S. Patent application Ser. No. 08/251,617, filed May 31, 1994, now U.S. Pat. No. 5,431,241, in which I am named coinventor and which is hereby incorporated by reference, discloses a traction control system combining an engine brake with an engine output power regulator. The combination of both forms of power limiting provides for improved response time.

Slip determination and control logic 36 provides for detecting drive wheel slip and for producing commands for controlling the engine output regulator 32. Although other methods can be used for detecting wheel slip, such as disclosed in my prior U.S. Pat. No. 5,213,177, which is also hereby incorporated by reference, a more conventional approach employing individual wheel speed sensors 38, 40, 42, and 44 is preferred for the practice of this invention.

Figure 2:
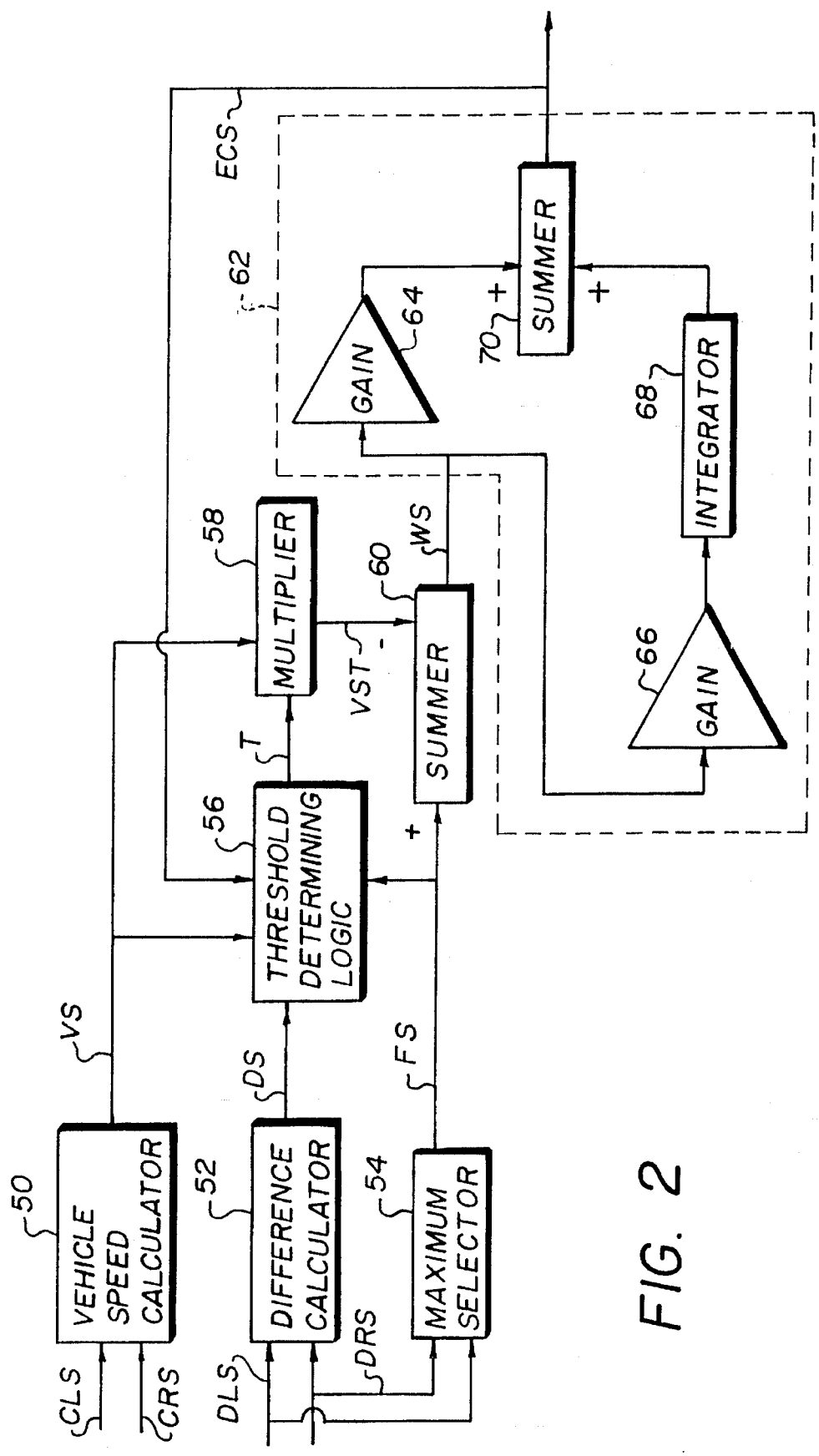
FIG. 2 is block diagram of functions performed by slip determination and control logic for controlling an engine output power regulator.

Referring also to FIG. 2, the wheel speed sensors 38 and 40 produce signals "DLS" and "DRS" representing the respective speeds of the left and right drive wheels 24 and 26, and the wheel speed sensors 42 and 44 produce signals "CLS" and "CRS" representing the respective speeds of the left and right coast wheels 28 and 30. A vehicle speed calculator 50 receives the signals "CLS" and "CRS" and outputs a signal "VS" representing vehicle speed in units of wheel rotation.

Both a difference calculator 52 and a maximum selector 54 receive the signals "DLS" and "DRS". The difference calculator 52 outputs a signal "DS" representing a difference in speed (i.e., differentiation) between the drive wheels 24 and 26. The maximum selector 54 passes the faster of the two speed signals "DLS" and "DRS" as a signal "FS". The signals "VS", "DS", and "FS" are received by threshold determining logic 56, along with an engine control signal "ECS", which is the output signal of the slip determination and control logic 36. The threshold determining logic 56 outputs a threshold signal "T", which is set to a target value for maximum permissible wheel slip.

A multiplier 58 outputs a signal "VST" that is a product of the vehicle speed "VS" and the threshold "T". The signal "VST" is subtracted from the faster drive wheel speed "FS" in summer 60 to produce a signal "WS" representing excess wheel slip.

The remaining circuit is a proportional integral controller 62, which integrates and scales the wheel slip signal "WS" to form the engine control signal "ECS" for eliminating the excess wheel slip "WS". The proportional integral controller 62 includes the usual features of two gain elements 64 and 66, a limited integrator 68, and a summer 70. Other control logic could be used, including control logic that is specially adapted to different engine output regulators.

Figure 3:
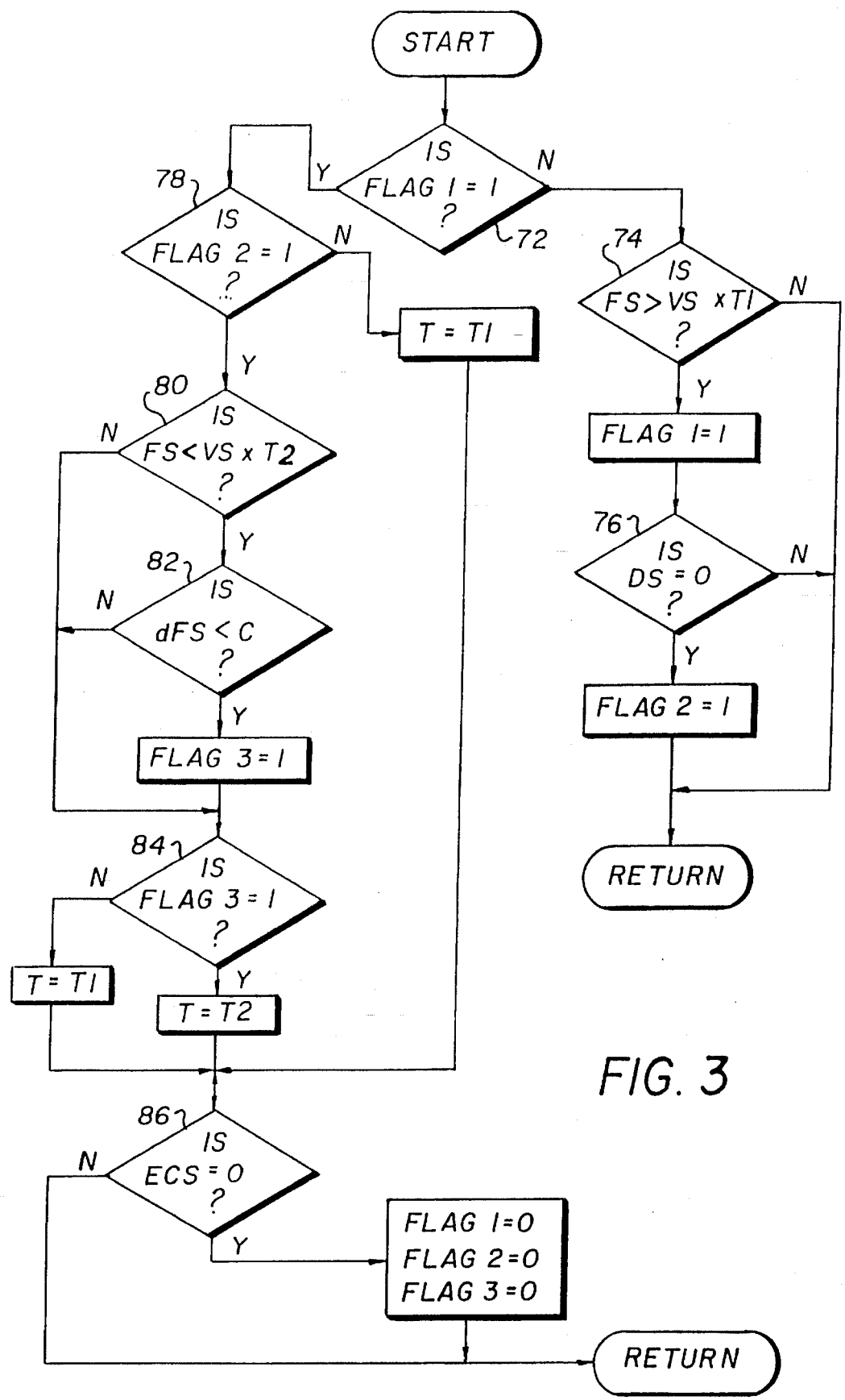
FIG. 3 is a flowchart of a threshold setting process.

The threshold determining logic 56 sets the threshold "T" equal to target values of either "T1" or "T2" as shown in FIG. 3. A fractional portion of the respective target values "T1" or "T2" is intended to represent wheel slip as a percentage of overall drive wheel rotational speed. The slip determination and control logic 36 controls the engine output power regulator 32 to limit the measured wheel slip to the current target value of the threshold "T", which is varied to better exploit the traction aiding capabilities of the differential 18.

A first decision step 72 divides the threshold determining logic 56 into two branches depending upon the status of flag "F1". If flag "F1" is not set, decision steps 74 and 76 present inquiries for setting flags "F1" and "F2". If flag "F1" is set, decision steps 78, 80, and 82 present inquiries for setting flag "F3."

According to the decision step 74, flag "F1" is set when the faster drive wheel speed "FS" exceeds the product of the vehicle speed "VS" and the target threshold "T1". Decision step 76 follows a positive outcome of the decision step 74 and sets flag "F2" when the differential rate "DS" is zero. (Of course, some tolerance of differential rate must be considered to implement practically.) Thus, both flags "F1" and "F2" are set when wheel slip exceeds the target threshold "T1" and both drive wheels 24 and 26 are rotating at the same speed.

Decision steps 78, 80, and 82 present a series of three conditions for setting flag "F3". Decision step 78 requires flag "F2" to be set in addition to flag "F1". Decision steps 80 and 82 require wheel slip below the target threshold "T2" and drive wheel acceleration "dFS" (which can be calculated within the threshold determining logic 56) below a predetermined constant "C" representing normal drive wheel accelerations under adequate traction conditions. Following positive outcomes of the decision steps 78, 80, and 82, decision step 84 sets the threshold "T" equal to "T1" if flag "F3" is not set and to "T2" if flag "F3" is set. The threshold "T" is also set to "T1" by decision step 78 if flag "F2" is not set. Finally, all three flags "F1," "F2", and "F3" are cleared by decision step 86 if the engine control signal "ECS" does not indicate a need for limiting drive power.

Normally, the threshold "T" is set to "T1", which is lower than "RT2". However, following the onset of a slip event, defined by wheel slip in excess of the lower target value "T1", the threshold determining logic 56 tests for certain conditions under which the threshold can be increased to the target value "T2". These conditions are intended to permit the differential 18 to divide torque unevenly between the drive wheels 24 and 26, thereby avoiding excess wheel slip while more closely matching the delivery of drive power to the drive wheels with the operator demand 34. The threshold is reset to the lower target value "T1" when the drive power is restored to the operator demand 34.

Figure 4A:
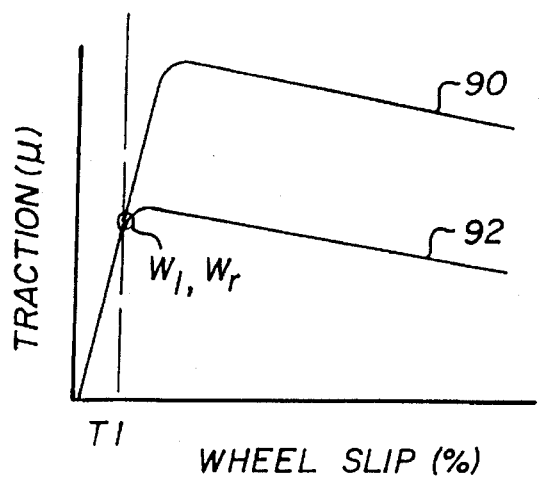
FIGS. 4A–4C are graphs illustrating traction improvements made possible by my invention.
Figure 4B:
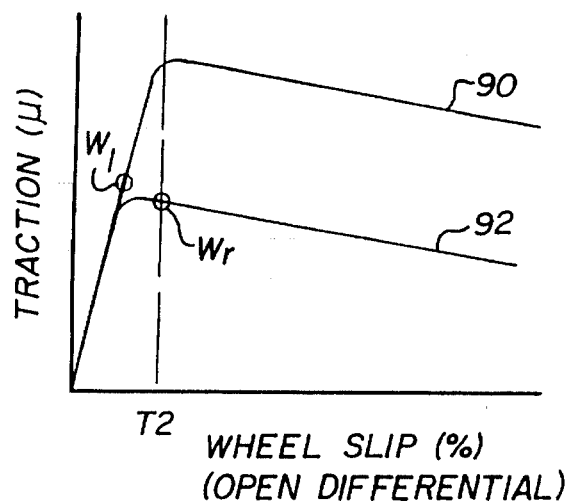
Figure 4C:
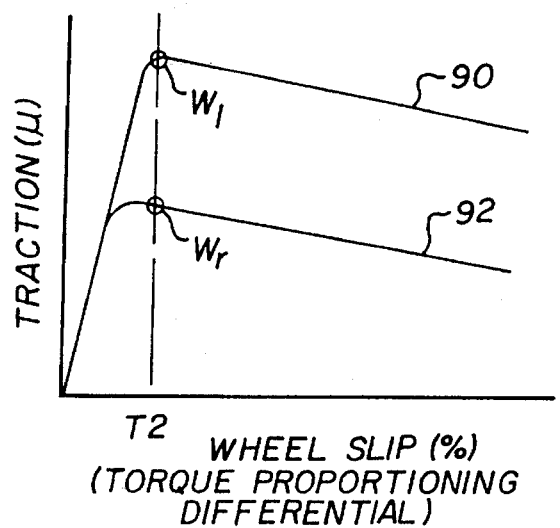

FIGS. 4A through 4C illustrate a potential improvement in traction by raising the threshold "T" from "T1" to "T2" and by replacing a conventional "open" differential with a differential that resists the onset of differentiation. The three graphs plot the available traction of the two drive wheels 24 and 26 as functions of wheel slip. The abscissas are scaled by coefficients of friction "$\mu$", and the ordinates are scaled by percent slip. Slip curves 90 and 92 represent uneven amounts of traction available to the two drive wheels over a range of wheel slip.

Initially, the available traction of both drive wheels 24 and 26 increases with wheel slip at approximately the same rate. However, the slip curve 92 peaks before the slip curve 90. Thereafter, the available traction of both drive wheels decreases at similar rates. Maximum traction is used when both drive wheels 24 and 26 are operating at the peaks of their respective slip curves. The target thresholds "T1" and "T2" provide for limiting the maximum amount of slip of both drive wheels 24 and 26, regardless of additional traction that may be available.

In FIG. 4A, the target threshold "T1" limits the instant traction "Wl" and "Wr" of both drive wheels to approximately the same amount. The threshold is raised to "T2" in FIG. 4B, but little of the additional traction along slip curve 90 is usable because conventional "open" differentials do not support significant bias ratios between the drive wheels. However, FIG. 4C demonstrates how the combination of an increased threshold and an increased bias ratio provides for using more of the available traction.

For maximum performance, both drive wheels should be operated at the respective peaks of their slip curves as shown in FIG. 4C. Although the actual slip curves are generally not known, their peaks generally fall between 15 and 30 percent wheel slip. The present invention assumes a lower initial threshold value to respond more quickly to instances of potentially excessive wheel slip. However, the threshold value can be increased during such a response to exploit traction differences between drive wheels if drive torque is not already divided at the bias ratio between drive wheels.

In addition to varying between the target values "T1" and "T2", the threshold "T" could also be varied over a continuum of target values during a slip event to better match the available traction conditions. Other inputs or criteria could also be processed to vary the threshold "T". For example, the disclosed control logic could be combined with other control logic to vary the threshold "T" on the basis of other vehicle operating conditions such as turning radius, vehicle speed, outside temperature, road roughness, and duration of the slip event.

I claim:

1. A traction control system for a motor vehicle having a source of drive power controllable by operator demand for the drive power and a pair of drive wheels connected to the source of drive power for propelling the vehicle comprising:

a power limiting system that regulates the drive power to the pair of drive wheels with respect to the operator demand for the drive power;

a power distributing system that divides the drive power between the pair of drive wheels and resists onset of relative rotation between the drive wheels;

sensors that detect (a) relative rotation between the drive wheels and (b) wheel slip of at least one of the drive wheels;

first control logic that reduces the drive power with respect to the operator demand in response to a measure of wheel slip above a threshold and restores the drive power to the operator demand in response to the measure of wheel slip below the threshold;

second control logic that adjusts the threshold from a first target value to a second target value when (a) the drive power is reduced with respect to operator demand and (b) the drive wheels are rotating at the same speed; and said second target value of the threshold being higher than said first target value for more closely matching the delivery of drive power to the drive wheels with the operator demand.

2. The system of claim 1 in which said second control logic determines a rate of change of wheel slip and requires the rate of change of wheel slip to be less than a predetermined rate before adjusting the threshold to the second target value.

3. The system of claim 2 in which said predetermined rate is a positive value that is smaller than values associated with incipient wheel slipping.

4. The system of claim 1 in which said second control logic requires the measure of wheel slip to be below the second target value before adjusting the threshold to the second target value.

5. The system of claim 1 in which said second control logic returns the threshold to the first target value after the drive power is restored to the operator demand.

6. The system of claim 1 in which said power distributing system is a torque proportioning differential that divides torque between relatively rotating drive wheels in a ratio of at least 1.5 to 1.

7. A method of limiting wheel slip in a vehicle having a power limiting system for regulating drive power to a pair of drive wheels with respect to the operator demand and a power distributing system for dividing the drive power and resisting relative rotation between the pair of drive wheels, comprising the steps of:

measuring wheel slip of at least one of the drive wheels;

activating the power limiting system for reducing the drive power with respect to the operator demand in response to a measure of wheel slip above a threshold;

continuing to activate the power limiting system until the drive power is restored to operator demand;

detecting relative rotational speed between the drive wheels; and adjusting the threshold during activation of the power limiting system from a first target value to a higher second target value in response to the detection of substantially equal rotational speeds between the drive wheels.

8. The method of claim 7 including the further step of readjusting the threshold to the first target value when the drive power is restored to operator demand.

9. The method of claim 7 including the further steps of determining a rate of change in wheel slip and requiring the rate of change to be below a predetermined rate before adjusting the threshold from the first target value to the higher second target value.

10. The method of claim 9 including the further step of requiring the measure of wheel slip to be below the second target value before adjusting the threshold from the first target value to the second target value.

11. The method of claim 7 in which wheel slip is measured in relation to a non-slipping wheel.

* * * * *